Aug. 21, 1956   H. M. CAMPBELL   2,759,246
METHOD OF MAKING HOLLOW ARTICLES
Filed Dec. 8, 1954   4 Sheets-Sheet 1

INVENTOR.
HUNTLY M. CAMPBELL
BY
AGENT

Aug. 21, 1956        H. M. CAMPBELL        2,759,246
METHOD OF MAKING HOLLOW ARTICLES
Filed Dec. 8, 1954        4 Sheets-Sheet 2
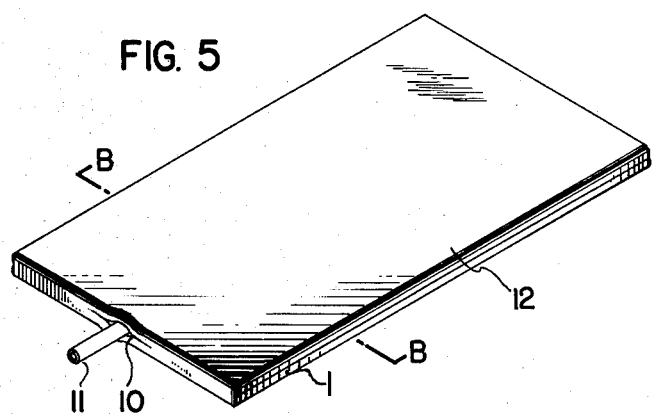
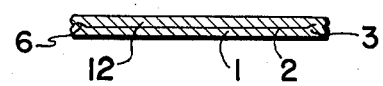
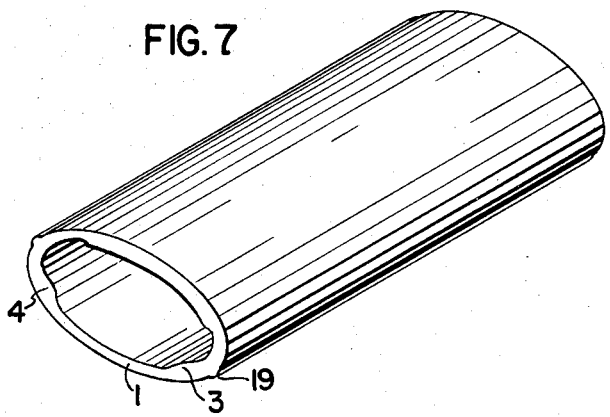
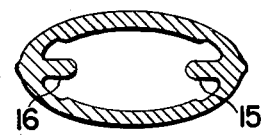
INVENTOR.
HUNTLY M. CAMPBELL
BY
AGENT Aug. 21, 1956 H. M. CAMPBELL 2,759,246
METHOD OF MAKING HOLLOW ARTICLES
Filed Dec. 8, 1954 4 Sheets-Sheet 3

INVENTOR.
HUNTLY M. CAMPBELL
BY
AGENT

INVENTOR.
HUNTLY M. CAMPBELL
BY
AGENT

United States Patent Office 2,759,246
Patented Aug. 21, 1956

2,759,246

METHOD OF MAKING HOLLOW ARTICLES

Huntly M. Campbell, Alton, Ill., assignor to Olin Mathieson Chemical Corporation, East Alton, Ill., a corporation of Virginia Application December 8, 1954, Serial No. 473,850

10 Claims. (Cl. 29—156.8)

This invention relates generally to metal working and more particularly to a novel method for making hollow articles such as tubes from sheet metal and to the resulting product.

It has been proposed to make some hollow metal articles such as heat exchangers, airplane propellers and the like from sheet metal by a forge welding process. Such a process involves placing a pattern of stop-weld material on a weldable sheet of metal, superimposing a second sheet of metal thereon and forge welding, by hot rolling, the unprotected areas of the contacting surfaces of the two metal sheets. The unwelded areas of the resulting forged welded structure are later expanded by means of fluid pressure to form the hollow article. Such a process has not been suitable for the manufacture of substantially seamless tubing, however, because the welded edges of the assembly cannot be trimmed accurately and sufficiently close to the unwelded portions to avoid an appreciably thick ridge extending along the sides of the expanded welded article. Consequently, seamless metal tubes are ordinarily made by an extrusion process but such a process has definite limitations as to the size of tube which can be produced.

It is therefore an object of this invention to provide a novel and improved method for making substantially smooth surfaced hollow articles from sheet metal. Another object of this invention is to provide a process for making substantially seamless tubes from sheet metal. A further object is to provide a novel method for making hollow articles from sheet metal which does not require application of stop-weld material between the metal sheets prior to forge welding. A still further object is to provide a novel hollow article having inwardly extending fins integral with the sidewalls of the article.

Other objects will become apparent from the following description with reference to the accompanying drawing, in which Figure 1 is a perspective view of a sheet of metal prepared with stop-weld prior to forge welding in accordance with this invention;

Figure 2:
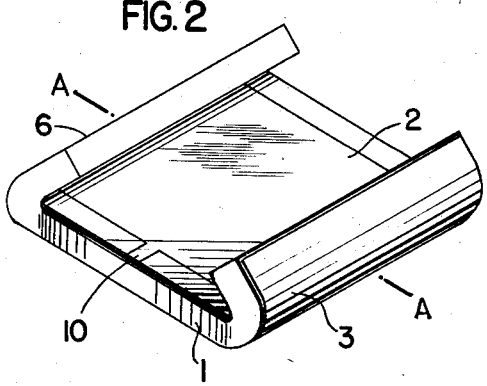
Figure 2 illustrates, in perspective, a metal sheet having opposite edges thereof bent and partially folded in accordance with an embodiment of this invention.
Figure 4:
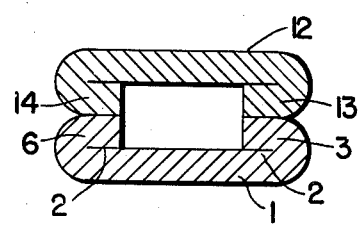
Figure 9:
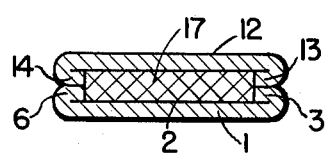
Figure 10:
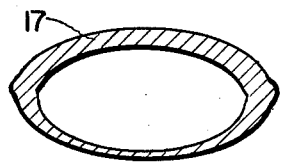
Figure 11:
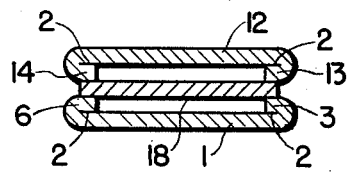
Figure 12:
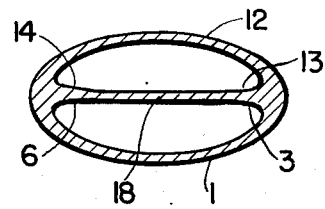
Figure 13:
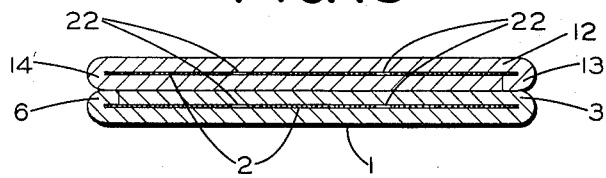
Figure 14:
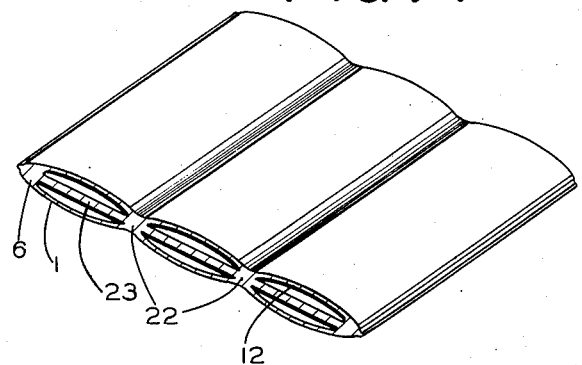
Figure 15:
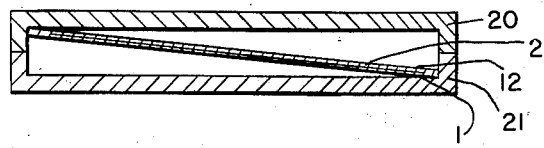
Figure 16:
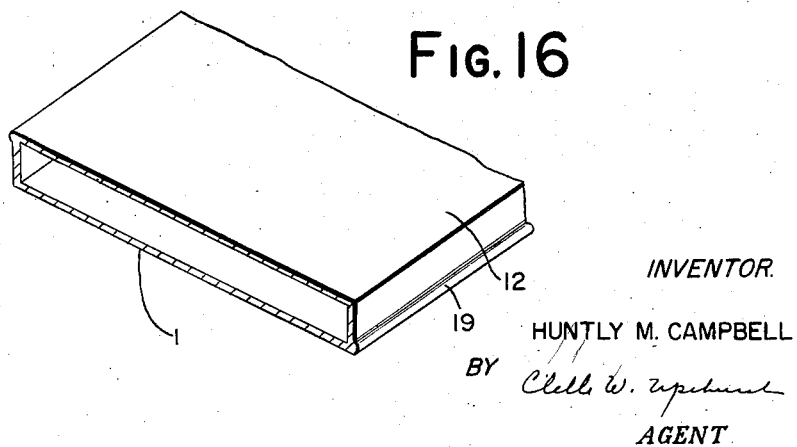

Figure 4 also illustrates, in cross section along line A—A, the sheet of Figure 2 assembled with a similar sheet in accordance with an embodiment of this invention;

Figure 5 illustrates an embodiment of this invention after forged welding;

Figure 6 illustrates, in a cross-sectional view along line B—B, the welded sheet of Figure 5;

Figure 7 illustrates an embodiment of this invention after inflation by means of fluid pressure;

Figure 8 illustrates another embodiment of this invention having internal fins;

Figure 9 illustrates an assembly of metal sheets suitable for forge welding to form an embodiment of this invention;

Figure 10 illustrates, in cross section, a product of the assembly of Figure 9 after welding and expanding by fluid pressure;

Figure 11 illustrates an assembly, prior to welding, suitable for forming an embodiment having a compound tube;

Figure 12 illustrates the embodiment of Figure 11 after welding and expansion;

Figure 13 illustrates, in cross section, an assembly, prior to forge welding, suitable for making another embodiment of the invention;

Figure 14 illustrates in perspective a tubular structure formed from the assembly of Figure 13;

Figure 15 illustrates, in cross section, the assembly of Figure 5 placed in a confining die; and Figure 16 illustrates in perspective an embodiment derived from the assembly of Figure 15.

The foregoing objects of the invention are accomplished, generally speaking, by folding the lateral portions adjacent a pair of opposite edges of a metal sheet into overlapping relationship with the remainder of the sheet, forge welding the exposed surface of the doubled-back portion or lap to a second sheet of metal and thereafter inflating the unwelded areas between the sheets by means of fluid pressure. It has been found that a substantially seamless tube having a substantially smooth outer surface can be made in accordance with this invention and that such a tube can be provided with integral inwardly extending fins which are of particular advantage in tubes for heat exchangers where it is desirable to expose an optimum amount of metal surface to the fluid in the tube.

In practicing the invention the surface of a weldable metal sheet is cleaned and then bent and folded along opposite edges to form integral bands or relatively narrow laps lying in contact with the face of the remainder of the sheet. A second clean sheet of weldable metal is placed in face to face relationship with the folded sheet and in contact with the exposed surfaces of the lap or doubled-back portion of the folded edges. The superimposed sheets are secured against relative slippage by spot-welding or other suitable means and the assembly is hot rolled to forge weld the surfaces of the lap to the second metal sheet. The assembly is preferably introduced into the nip between the rolls unfolded edge first in order that the direction of rolling is parallel to the axis of the folds. In this way the leading edge as well as the trailing edge of the superimposed sheets become welded and, consequently, since the lap is also welded to the contiguous portion of the other sheet, the resulting unit has a welded border completely thereabout with an unwelded interior adapted to be expanded by means of fluid pressure. The joint formed between the two sheets in accordance with this invention is much stronger than a joint formed by using a separate strip of metal to replace the lap formed by folding. Indeed, it has been found that the joint between sheets formed in accordance with this invention is frequently capable of withstanding greater internal pressures than other parts of the hollow article's wall.

In some instances, the metal sheets are provided with a suitable stop-weld or stop-off material on those areas which are not to be forge welded but, it has been found, that stop-weld is not required in some assemblies of metal sheets if the proper conditions are provided during forge welding. In such an embodiment, a sheet of metal is folded along opposite edges and is thereafter placed face to face with a second sheet with the laps along the folded edges contacting the second sheet. The assembly is then hot rolled at a nip pressure such that only the leading edge, trailing edge and the contacting surfaces along the folded edges are welded. If such control is exercised no stop-weld is required on those areas lying between the laps and a relatively short band along the leading and trailing edge of the sheets. The nip pressure and consequently the amount of reduction in thickness of the sheet by rolling required to effect "border welding" without stop-weld protecting the areas to remain unwelded will vary with different metals but will ordinarily lie within the range of from about 35 per cent to not more than about 65 per cent reduction in sheet thickness. If the metal sheets are properly cleaned aluminum sheets without stop-weld, the nip pressure must be such that the thickness of the sheets in those areas not protected by stop-weld is reduced not more than 60 per cent by hot rolling. To insure that the sheets are welded along the four edges, however, the nip pressure must be such that the thickness of the assembly along these marginal edges is reduced at least 60 per cent. Because of the greater thickness of the folded marginal edges of the assembly, it is possible to roll at pressures which reduce these edges in thickness 60 per cent or more without reducing the thickness of the assembly in those areas lying between the edges more than 60 per cent. The thickness of copper alloy sheets should not be reduced more than about 50 per cent in those areas not protected by stop-weld if welding is not desired. Those areas to be welded must be reduced at least 50 per cent by hot rolling. If greater nip pressures are used in the hot rolling operations stop-weld must be sandwiched between the sheets to protect those areas which are not to be welded.

Figure 1:
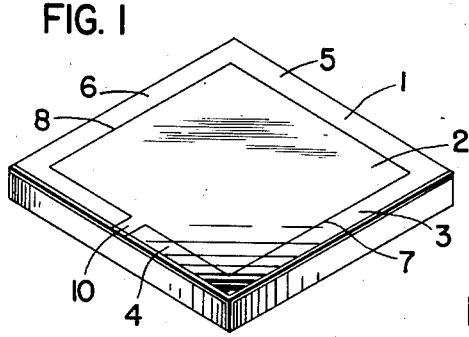

Referring to the accompanying drawing, a sheet of aluminum 1 about 0.025 inch thick is illustrated in Figure 1. This sheet is degreased by immersing it in an organic solvent such as naphtha or white gasoline at room temperature and wiping it free of solvent. Any oxide on the surface of the film is removed either by conventional chemical or mechanical means such as scratch brushing and a pattern of stop-weld 2 is applied by means of a silk screen to one surface thereof. As illustrated in the drawing, the stop-off material does not extend to the edge of the sheet except in a rather narrow band 10 to facilitate expansion after welding. A suitable stop-weld is composed of a mixture of 13 per cent colloidal graphite, about 40 per cent calcium carbonate having a granulation of 325 mesh and about 47 per cent water.

Figure 3:
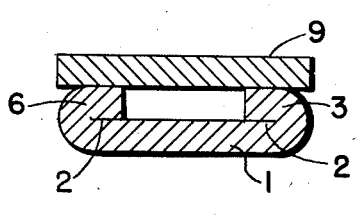
Figure 3 illustrates, in cross section, the sheet of Figure 2 taken along the line A—A and assembled with a flat sheet of metal in accordance with an embodiment of this invention.

Sheet 1 is bent along the edges 7 and 8 of stop-weld 2 and turned over 180 degrees to form laps 3 and 6 from the lateral portions of the sheet 1 adjacent edges 7 and 8. Laps 3 and 6 are illustrated in a partially folded position in Figure 2. A clean flat sheet of aluminum 9 of the dimensions similar to those of sheet 1 after folding is superimposed over sheet 1, such as is illustrated in Figure 3. The assembly is secured together by spot welding the contacting surfaces of sheet 9 and laps 3 and 6.

The assembly is placed in a suitable furnace and heated to about 1000° F. in a reducing atmosphere and, while at substantially this temperature, it is passed between the rolls of a rolling mill to reduce its thickness from about 60 to about 65 per cent in a single pass. The contacting surfaces of laps 3 and 6 with sheet 9 are thus forge welded into a unitary structure with the line of demarcation between the contacting surfaces substantially completely erased. As shown to best advantage in Figure 6, the regions protected by stop-weld 2 are not welded. The stop-weld 2 elongates in the rolling process to the same extent as the sheet. The assembly may later be rolled at room temperature to the desired final gauge. This rolling may reduce the thickness from 20 to 30 per cent in some instances. Of course, the hot rolling pressure and the metal sheet thickness may be predetermined in order that the desired final gauge is obtained in this step and no cold rolling is required.

The structure is next annealed at a temperature of about 650° F. for about one-half hour. The unwelded portion bounding stop-weld 10 is pried apart and a suitable inflating tube 11, Figure 5, is driven into the opening. Fluid pressure is then applied to expand the unwelded areas in the region of the stop-weld and a tube of the type illustrated in Figure 7 having a slightly thickened wall resulting from the presence of laps 3 and 6 is produced. Such a tube usually has a substantially smooth external surface if the sheets are carefully matched together before rolling but, in some instances, a slight ridge 19 may remain at the juncture of the two sheets of metal. This ridge is small enough that it is not objectionable.

In another embodiment of this invention, two folded aluminum sheets are superimposed as illustrated in Figure 4. Laps 3 and 6 of sheet 1 and laps 13 and 14 of sheet 12 are welded together by a hot roll process and expanded substantially in accordance with the process described in the foregoing embodiment. A tube similar to that of Figure 7 is obtained upon expansion if the stop-weld 2 extends between the overlapping portion of sheet 1 but does not extend between the overlapping portions 13 and 14 and sheet 12. The thickness of a portion of the tube wall, indicated as 3 and 6 in Figure 7, is somewhat greater if two folded sheets are utilized than if one folded sheet and one flat sheet are used to make up the pair of superimposed metal sheets.

The stop-weld 2 may be applied to the aluminum sheet 12 in such a pattern that it extends between the face of sheet 12 and laps 13 and 14. When assembled with sheet 1 having stop-weld 2 extending between the laps 3 and 6 and the contiguous surfaces of sheet 1 only the opposing surfaces of laps 3 and 13 and 6 and 14 are welded by hot rolling and, after expansion, a tube similar to that in Figure 8 is obtained having inwardly directed fins 15 and 16 derived from laps 3 and 13 and 6 and 14, respectively. The various steps in the process required to achieve forge welding and subsequent inflation in this embodiment are substantially the same as those discussed in detail in the foregoing.

In still another embodiment of this invention, a pair of folded sheets 1 and 12 are superimposed with the exposed surfaces of the laps in contact with each other and a third sheet of metal 17 positioned between the pair of folded sheets 1 and 12, as is illustrated in Figure 9. This assembly has stop-weld 2 between the surface of sheet 17 and the adjacent face of sheet 1. The stop-weld 2 extends between the laps 3 and 6 and the contiguous face of sheet 1, but no stop-weld is sandwiched between laps 13 and 14 and the adjacent surfaces of sheet 12 or between sheet 17 and sheet 12. The resulting assembly is secured together by spot welding and processed in accordance with the procedure discussed in detail in conjunction with the foregoing embodiments. After inflation the tube has a slightly thickened wall because of laps 3, 6, 13 and 14 and also a thickened portion along the wall formed from former sheet 12 because of sheet 17.

As pointed out hereinbefore, it has been found that stop-weld is not required in all embodiments to produce unwelded areas if the sheet is folded before hot rolling as provided by this invention. In one embodiment of the invention the edges of the sheet are folded over to form laps 3 and 6, as indicated in Figure 2 but no stop-weld is applied to the face of the sheet. The folded sheet 1 is assembled with either a flat sheet such as 9 in Figure 3 or with a folded sheet 12 of the type shown in Figure 4. The assembly is heated to the desired temperature, about 1000° F. if the metal is aluminum, and the sheet is rolled at this temperature. As pointed out above, the amount of reduction of the sheet along its folded edges must be at least 60 per cent in order to substantially completely erase any line of demarcation in the region of the welds but it cannot exceed 60 per cent in those areas which are not to be welded. An opening is drilled in the assembly to permit access to the unwelded areas for the purpose of expansion.

The other processing steps utilized are substantially the same as were described in the foregoing in conjunction with the embodiments using stop-weld. However, it is to be noted that unless a band of stop-weld material is placed either between laps 13 and 14 and sheet 12 or between laps 3 and 6 and sheet 1 of Figure 4 that a relatively heavy wall will be produced on each side of the resulting inflated article. If, on the other hand, stop-weld is placed between the laps of either sheet the inflated article will be thickened only in the regions indicated in Figure 7. In the assembly of Figure 3, a band of stop-weld material should be included between laps 3 and 6 and sheet 1 to produce a tube of the type illustrated in Figure 7. By controlling the reduction in thickness during rolling to not more than 60 per cent in those areas not to be welded, however, it is possible to effect border welding without using stop-weld between the opposing flat surfaces of sheets 1 and 12 or 9, as the case may be, which lie between the ends of the laps or folded over portions.

As illustrated in Figures 11 and 12, the invention also provides a means for making tubes or other hollow articles having a plurality of passageways or conduits. In Figure 11, the two folded aluminum sheets 1 and 12 are assembled with an intermediate sheet 18. The intermediate sheet 18 is of such length that it extends between the laps 13 and 14 of sheet 12 and laps 3 and 6 of sheet 1. Stop-weld material is included between each of the laps and the adjacent integral surfaces of the sheets and, in some embodiments, may completely cover the surfaces of sheets 12 and 1 lying opposite the intermediate sheet 18. The assembly is spot welded, heated to about 1000° F. and hot rolled according to substantially the same procedure as described in conjunction with the foregoing embodiments. Upon inflation, a compound tube of the type illustrated in Figure 12 is obtained.

The assembly illustrated in Figure 13 is composed of folded metal sheets 1 and 12 having folded over edges 3 and 6 and 13 and 14, respectively. It is to be noted that stop-weld 2 is included between the folded over portions 13 and 14 and the balance of sheet 12 and also between the folded over portions 3 and 6 and the balance of sheet 1. This stop-weld 2 is not continuous in the axial direction, however, and voids 22 extend longitudinally through the assembly. After hot rolling in accordance with the same procedure as described in conjunction with the foregoing examples, the sheet is inflated to produce a tubular structure of the type illustrated in Figure 14. Where no stop-weld material was present the sheets were welded together as illustrated at 22 in Figure 14 and conduits were formed adjacent the stop-weld having an intermediate partitioning member 23 which resulted from the welding of folded over portions 14 and 6 and 3 and 13. Although the particular embodiment illustrated in Figure 13 is formed from only two sheets of metal, an assembly of three sheets, such as one similar to that of Figure 9, can be used to fabricate a structure having several passageways of the type shown in Figure 14. These passageways may extend tortuously through the assembly, if desired.

In Figure 15, an assembly of the type illustrated in Figure 5 is placed in a two-piece die 20 and 21 and inflated to form a rectangular structure such as is illustrated in Figure 16. In this particular embodiment, the die is of the dimensions required in the finished article and the assembly is necessarily of greater width. In order to compensate for the greater width of the assembly, it is placed diagonally in the die and when inflated the ridge 19 is located near the corner, as is illustrated in Figure 16. In some embodiments it may be desirable to place the assembly horizontally in the die in which case the parts 20 and 21 are separated and the edges of the assembly permitted to extend therebetween. As the assembly is inflated, the sheet will become narrower and will be drawn into the die and at this time the die can be closed and further inflation will form a structure similar to that of Figure 16. A hollow structure of the type produced in accordance with the embodiments illustrated in Figures 15 and 16 is particularly well suited for structural members and can be used for making doors or other similar articles of manufacture.

Although the invention is described in the foregoing in conjunction with the use of aluminum any other pressure weldable metal sheets can be utilized. For example, copper, copper base alloys, such as bronzes, brasses and the like, steel and many other metals can be processed in accordance with this invention. In the embodiments using stop-weld, the composition of the stop-weld may be a mixture of sodium silicate and colloidal graphite or any other suitable material. It is to be understood that the surfaces to be welded must be cleaned for best results. Any method for degreasing the metal sheets such as immersing them in an aqueous solution of trisodium phosphate, sodium orthosilicate or other cleaners of this type may be utilized in conjunction with, or in the place of, the organic solvent. It is also sometimes necessary with some alloys, particularly with copper base alloys, to clean the surface of the assembly after hot rolling and before cold rolling. This cleaning may be achieved by dipping the assembly in an aqueous solution of sodium orthosilicate or similar material, rinsing in cold water and thereafter pickling by dipping the assembly in a suitable aqueous solution of an acid, such as, for example a 10 per cent sulfuric acid solution. Of course, any other suitable method for cleaning metals can be utilized.

Although it is preferred to use a silk screen for applying the pattern of stop-weld to the metal sheet because of the simplicity of such an operation, any other suitable means such as spraying, brushing, etc. can be utilized. The temperature at which the layers are forge-welded by rolling will vary somewhat with the particular metals but for all practical purposes the temperature should be within the range of about 100° C. of the recrystallization point of the metal. At such a temperature and with the proper amount of reduction in metal thickness a substantially complete erasure of any line of demarcation between the superimposed sheets is achieved. Any suitable means for bending the metal to turn back the sheet along its edges can be utilized. One suitable means is to use a mechanical brake or press. The welded assembly may be expanded while confined in suitable dies of the desired shape of the finished product or it may be expanded without using confining dies.

It should be apparent from the foregoing that the invention provides a means for making hollow articles having a substantially smooth external surface and that relatively large hollow articles such as sections of airplane wings or sections of other structural elements can be made in accordance with this process.

Many variations in the foregoing will occur to those skilled in the art and can be made in the various embodiments described in detail in the foregoing without departing from the spirit and scope of the invention except insofar as it is limited by the appended claims.

What is claimed is:

1. A method for making hollow articles from sheet metal which comprises coating a metal sheet with stop-weld; folding over the lateral portions of the metal sheet lying adjacent each of a pair of opposite edges thereof to form a second layer of metal which only partially overlaps and lies substantially against the remainder of the sheet with stop-weld sandwiched therebetween; assembling the folded sheet with a second sheet with the exposed surface of the resulting laps in contact with the second sheet and with stop-weld sandwiched between the inner faces of the first said sheet and the second sheet; securing the sheets against relative slippage; hot rolling the assembly to simultaneously elongate the assembly, to forge weld the laps of the folded sheet to said second sheet and to reduce the assembly in thickness until it is substantially uniform throughout and the unwelded faces having stop-weld therebetween are substantially in contact with each other; and thereafter expanding the unwelded areas between the sheets with fluid pressure.

2. A method for making hollow articles from sheet metal which comprises applying a pattern of stop-weld to the face of a clean weldable metal sheet, folding over the lateral portion of a metal sheet lying adjacent each of a pair of opposite edges thereof by bending the sheet along an axis parallel to each edge to form second layers which only partially overlap and lie substantially against the remainder of the sheet but have stop-weld sandwiched between the resulting laps and the face; assembling the folded sheet with a second sheet with the exposed surface of the resulting laps in contact with the second sheet; securing the sheets against relative slippage; hot rolling to simultaneously elongate the assembly, to forge weld the contacting surfaces of said laps to the second metal sheet, but not to weld the opposing faces of the sheets lying between the two laps and the remainder of the folded sheet, to press the opposing faces of the sheets in the unwelded areas substantially into contact with each other and reduce the thickness to a substantially uniform thickness throughout; and thereafter expanding the unwelded areas between the sheets with fluid pressure.

3. A method for making hollow articles having fins integral with the side walls of said articles and extending inwardly into the conduit of the hollow article which comprises coating with stop-weld the lateral portion of a metal sheet lying adjacent each of a pair of opposite edges thereof, folding the lateral portions over into overlapping relationship with the remainder of said sheet and thus sandwiching stop-weld therebetween; superimposing the resulting sheet with a similarly folded metal sheet; securing the sheets against relative slippage; hot rolling the assembly to simultaneously elongate the assembly, to forge weld only the contacting surfaces of the laps of the pair of sheets together, and to press the remainder of the sheets together substantially into contact with each other to produce an assembly substantially uniform in thickness throughout; and thereafter expanding the unwelded areas between the sheets and between the welded laps and the remainder of the sheets with fluid pressure to form a tubular structure having the welded laps extending inwardly as fins.

4. A method for making hollow articles from sheet metal which comprises folding over the lateral portion lying adjacent each of a pair of opposite edges of a metal sheet by bending the sheet along an axis parallel to the edge to form a second layer which only partially overlaps and lies substantially against the remainder of the sheet but with stop-weld therebetween; superimposing a second sheet of metal and the folded sheet with the resulting laps in contact with the face of said second sheet; securing the sheets against relative slippage; feeding the resulting assembly into the nip between the rolls of a metal rolling mill unfolded edge first and thus elongating the assembly and pressure welding the surface of said laps to the second sheet at a pressure which substantially removes the line of demarcation between said lap and said sheet and presses the remainder of the sheets together substantially in contact with each other but without forge welding; and thereafter expanding the unwelded areas lying between the sheets with fluid pressure.

5. A method for making hollow articles from sheet metal which comprises folding over the lateral portion of a metal sheet lying adjacent each of a pair of opposite edges thereof to form a second layer which only partially overlaps and lies substantially against the remainder of the sheet but with stop-weld therebetween; assembling the folded sheet with a second metal sheet with the exposed surface of the resulting laps in contact with the second sheet; securing the sheets against relative slippage; heating the resulting assembly to hot rolling temperatures, passing the heated assembly between the rolls of a rolling mill and simultaneously reducing the thickness of the assembly and increasing the length thereof in a direction parallel to the axis of said sheets and welding the laps to the surface of the other sheet until the opposing faces in the unwelded areas are substantially in contact with each other but are not welded together and the assembly has a substantially uniform thickness throughout; and thereafter expanding the unwelded areas between the sheets with fluid pressure.

6. A method for making hollow articles from sheet metal having about one-half of its wall thicker than the remainder thereof which comprises folding over each of a pair of opposite edges of a metal sheet to form a second layer which only partially overlaps and lies substantially against the remainder of the sheet but with stop-weld therebetween; assembling the sheet with a similarly folded sheet free from stop-weld and with a third unfolded sheet lying between the folded sheets, said third sheet lying substantially in contact with the ends of the overlapped portions of the other two sheets and filling the space which would otherwise lie between the opposing surfaces of those sheets which lie between the overlapping portions, a layer of stop-weld being sandwiched between the surface of said third sheet and the opposing surface of the first said folded sheet having stop-weld; securing the sheets against relative slippage; hot rolling the resulting assembly to simultaneously elongate the assembly, to weld the contacting surfaces of the three sheets not protected by stop-weld, and to press the unwelded surfaces separated by stop-weld substantially into contact with each other and to reduce the thickness of the assembly until substantially uniform throughout; and thereafter inflating the unwelded areas with fluid pressure.

7. A method for making hollow articles from sheet metal having a partition therein which comprises folding over a lateral portion along each of a pair of opposite edges of a metal sheet to form a second layer which only partially overlaps and lies substantially against the remainder of the sheet with stop-weld therebetween; assembling this sheet with a similarly folded sheet having stop-weld and with a third flat sheet therebetween which extends between the folded over portions of the other sheets; securing the sheets against relative slippage; hot rolling to simultaneously elongate the assembly, to forge weld the third sheet to the overlapping portions of the other sheet, and press a surface of the third sheet substantially into contact with the surface of each of the other sheets but not weld them together and to reduce the assembly to a substantially uniform thickness throughout; and thereafter inflating the unwelded areas lying between each side of the third sheet and the other sheets.

8. In a method of making hollow articles from sheet metal, the steps which comprise folding a sheet of metal inwardly along a pair of opposite edges to form laps substantially in contacting relationship with the remainder of the sheet but with stop-weld sandwiched therebetween, assembling the folded sheet with a second sheet of metal lying on the exposed surfaces of the laps of the first said sheet, securing the assembled sheets against relative slippage, and hot rolling the resulting assembly to simultaneously elongate the assembly, to forge weld the laps of the first sheet to the second sheet and to reduce the assembly in thickness until it is substantially uniform throughout and the opposing unwelded faces of the assembly are substantially in contact with each other.

9. A method for making hollow articles from sheet metal which comprises folding over a metal sheet along at least one edge thereof to form a second layer of metal which only partially overlaps and lies substantially against the remainder of the sheet but has stop-weld therebetween; folding at least one edge of a second metal sheet to form a second layer of metal which only partially overlaps and lies substantially against the remainder of the sheet but has stop-weld therebetween; assembling the two sheets together with the resulting laps of each sheet lying against the other sheet and with the two sheets arranged with respect to each other so that a folded edge of at least one sheet is at each of a pair of opposite sides of the assembly; securing the sheets against relative slippage; and hot rolling to simultaneously elongate the assembly, to forge weld only the surface of each of the overlapping portions to the contacting surface of the other sheet and to reduce the thickness of the assembly to a substantially uniform thickness throughout.

10. A method for making hollow articles from sheet metal which comprises placing a plurality of spaced bands of stop-weld along a common axis on a metal sheet; bending and folding the sheet inwardly along a pair of opposite edges to form laps which lie in abutting relationship with each other and which together completely overlap the surface of the remainder of the sheet with each lap lying substantially against said surface but sandwiching the bands of stop-weld therebetween; assembling the resulting folded sheet with a similarly folded sheet having laps which lie in abutting relationship with each other and which together completely overlap the surface of the sheet with each lap lying substantially against said surface but sandwiching the bands of stop-weld therebetween, the resulting assembly having the overlapping portions of each sheet lying in contacting relationship with each other; securing the sheets against relative slippage; hot rolling to simultaneously elongate the assembly, to weld the contacting surfaces of the laps of one sheet to the laps of the other sheet, to weld those areas between the laps and the remainder of the sheet which are unprotected by the bands of stop-weld, and to press the unwelded areas substantially into contact with each other; and thereafter expanding the unwelded areas between the resulting layers of the assembly lying adjacent the bands of stop-weld with fluid pressure.

References Cited in the file of this patent

UNITED STATES PATENTS

| | | |
|---|---|---|
| 722,398 | Bock | Mar. 10, 1903 |
| 813,918 | Schmitz | Feb. 27, 1906 |
| 1,177,320 | Grabowski | Mar. 28, 1916 |
| 1,697,035 | Wells | Jan. 1, 1929 |
| 1,699,688 | Cross | Jan. 22, 1929 |
| 1,938,633 | Maskrey | Dec. 12, 1933 |
| 2,244,800 | Pascale | June 10, 1941 |
| 2,261,136 | Brown | Nov. 4, 1941 |
| 2,284,773 | Sivian | June 2, 1942 |
| 2,342,117 | Brown | Feb. 22, 1944 |
| 2,582,358 | Schoellerman | Jan. 15, 1952 |
| 2,690,002 | Grenell | Sept. 28, 1954 |